（12）United States Patent
Bose et al.

(10) Patent No.: US 7,627,742 B2
(45) Date of Patent: Dec. 1, 2009

(54) METHOD AND APPARATUS FOR CONSERVING POWER BY THROTTLING INSTRUCTION FETCHING WHEN A PROCESSOR ENCOUNTERS LOW CONFIDENCE BRANCHES IN AN INFORMATION HANDLING SYSTEM

(75) Inventors: Pradip Bose, Yorktown Heights, NY (US); Alper Buyuktosunoglu, White Plains, NY (US); Chen-Yong Cher, Port Chester, NY (US); Michael Karl Gschwind, Chappaqua, NY (US); Ravi Nair, Briarcliff Manor, NY (US); Robert Alan Philhower, Valley Cottage, NY (US); Wolfram Sauer, Austin, TX (US); Raymond Cheung Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/733,589

(22) Filed: Apr. 10, 2007

(65) Prior Publication Data

US 2008/0256345 A1  Oct. 16, 2008

(51) Int. Cl.
  *G06F 1/32* (2006.01)
(52) U.S. Cl. ...................... 712/220; 712/205
(58) Field of Classification Search .............. 712/220, 712/205
  See application file for complete search history.

(56) References Cited

U.S. PATENT DOCUMENTS

| | | | |
|---|---|---|---|
| 5,553,255 A * | 9/1996 | Jain et al. | 712/235 |
| 6,272,666 B1 | 8/2001 | Borkar et al. | |
| 6,282,663 B1 | 8/2001 | Khazam | |
| 6,363,490 B1 | 3/2002 | Senyk | |
| 6,385,697 B1 * | 5/2002 | Miyazaki | 711/128 |
| 6,393,374 B1 | 5/2002 | Rankin et al. | |
| 6,411,156 B1 | 6/2002 | Borkar et al. | |
| 6,415,388 B1 | 7/2002 | Browning et al. | |
| 6,438,682 B1 * | 8/2002 | Morris et al. | 712/241 |
| 6,484,265 B2 | 11/2002 | Borkar et al. | |
| 6,564,328 B1 | 5/2003 | Grochowski et al. | |
| 6,608,528 B2 | 8/2003 | Tam et al. | |
| 6,625,744 B1 | 9/2003 | Rappoport et al. | |

(Continued)

FOREIGN PATENT DOCUMENTS

WO  PCT/US99/24194  5/2000

OTHER PUBLICATIONS

Kang,D. etal., Speculation Control for Simultaneous Multithreading, 2004, IEEE, 10 pages.*

(Continued)

*Primary Examiner*—Eric Coleman
(74) *Attorney, Agent, or Firm*—Diana R. Gerhardt; Mark P. Kahler (57) ABSTRACT

An information handling system includes a processor that throttles the instruction fetcher whenever the inaccuracy, or lack of confidence, in branch predictions for branch instructions stored in a branch instruction queue exceeds a predetermined threshold confidence level of inaccuracy or error. In this manner, fetch operations slow down to conserve processor power when it is likely that the processor will mispredict the outcome of branch instructions. Fetch operations return to full speed when it is likely that the processor will correctly predict the outcome of branch instructions.

17 Claims, 5 Drawing Sheets

U.S. PATENT DOCUMENTS

| | | |
|---|---|---|
| 6,762,629 B2 | 7/2004 | Tam et al. |
| 6,766,441 B2 * | 7/2004 | Sinharoy .................. 712/237 |
| 6,788,156 B2 | 9/2004 | Tam et al. |
| 6,908,227 B2 | 6/2005 | Rusu et al. |
| 6,931,559 B2 | 8/2005 | Burns et al. |
| 2003/0117759 A1 | 6/2003 | Cooper |
| 2003/0126478 A1 | 7/2003 | Burns et al. |
| 2003/0126479 A1 | 7/2003 | Burns et al. |
| 2003/0188211 A1 | 10/2003 | Chen |
| 2003/0204762 A1 | 10/2003 | Lee et al. |
| 2004/0071184 A1 | 4/2004 | Naveh et al. |
| 2004/0139301 A1 * | 7/2004 | McDonald ................. 712/218 |
| 2004/0148528 A1 | 7/2004 | Silvester et al. |
| 2004/0158771 A1 | 8/2004 | Garnett et al. |
| 2005/0044434 A1 | 2/2005 | Kahle et al. |
| 2005/0102544 A1 | 5/2005 | Brewer et al. |
| 2005/0138438 A1 | 6/2005 | Bodas |
| 2005/0166075 A1 | 7/2005 | Hack |
| 2005/0235170 A1 * | 10/2005 | Atkinson .................. 713/320 |
| 2005/0283624 A1 | 12/2005 | Kumar et al. |
| 2006/0020831 A1 | 1/2006 | Golla et al. |
| 2006/0174090 A1 | 8/2006 | Sartorius et al. |

OTHER PUBLICATIONS

Luo, K et al., Balancing throughput and Fairness in SMT Processors, 2001, IEEE, pp. 164-171.*

Crepps—Improving Multi-Core Architecture Power Efficiency Through EPI Throttling and Asymmetric Multiprocessing, Technology @ Intel Magazine (Feb. 2006).

Felter—A Performance-Conserving Approach for Reducing Peak Power Consumption in Server Systems, ICS'05 (Jun. 2005).

Hofstee—Power Efficient Processor Architecture and The Cell Processor, IEEE HPCA (Nov. 2005).

Intel-1—VRM 9.0 DC-DC Converter Design Guidelines, Intel (Apr. 2002).

Intel-2—Embedded Voltage Regulator-Down (EmVRD) 11.0, Intel Design Guidelines (Aug. 2006).

Aragon, J. L. et al., "Power-aware control speculation through selective throttling", High-Performance Computer Architecture, 2003. HPCA-9 2003. Proceedings The Ninth International Symposium on Feb. 8-12, 2003, Piscataway, NJ, USA, IEEE, Feb. 8, 2003, pp. 103-112, XP010629505 ISBN: 978-0-7695-1871-8.

Manne, S. et al., "Pipeline gating: Speculation Control for Energy Reduction", Computer Architecture, 1998. Proceedings. The 25th Annual International Symposium on Barcelona, Spain Jun. 27-Jul. 1, 1998, Los Alamitos, CA, USA, IEEE Comput. Soc, US, Jun. 27, 1998, pp. 132-141, XP 010291372 ISBN: 978-0-8186-8491-3.

European Patent Office, "Notification of Transmittal of the International Search Report and the Written Opinion of the International Searching Authority, or the Declaration", Jul. 28, 2008.

US 6,330,680, 12/2001, Browning et al. (withdrawn)

* cited by examiner

METHOD AND APPARATUS FOR CONSERVING POWER BY THROTTLING INSTRUCTION FETCHING WHEN A PROCESSOR ENCOUNTERS LOW CONFIDENCE BRANCHES IN AN INFORMATION HANDLING SYSTEM

TECHNICAL FIELD OF THE INVENTION

The disclosures herein relate generally to processors, and more particularly, to processors that employ power conservation methodology in information handling systems.

BACKGROUND

Modern information handling systems use processors that often generate a substantial amount of heat. Thermal throttling techniques exist that sense the temperature of the processor. When the processor's temperature exceeds a predetermined threshold temperature, the system throttles or reduces the processor's clock rate to correspondingly reduce the processor's temperature. In this manner, the system prevents undesirable overheating. Alternatively, the system may employ clock gating, i.e. stopping the processor's clock for a period of time, to reduce the processor's temperature.

Power consumption is a significant contributing factor to the maximum operating frequency of modern processors. Power throttling techniques are available that sense the amount of power that a processor consumes. When the consumed power exceeds a predetermined threshold power level, a power throttling system reduces the operating frequency of the processor so that the processor consumes less power.

What is needed is an apparatus and methodology that achieves further reduction in power consumption by processors in information handling systems.

SUMMARY

Accordingly, in one embodiment, a method is disclosed for operating a processor. The method includes fetching, by a fetcher instructions from an instruction source to provide an instruction stream that includes fetched branch instructions. The method also includes storing, by a branch instruction queue, a plurality of fetched branch instructions from the instruction stream. The method further includes speculatively executing, by a branch execution unit, fetched branch instructions by using branch prediction information and resolving whether or not a branch in each fetched branch instruction is taken, thus providing executed branch instructions. The method still further includes storing, by a confidence storage memory, confidence information describing an amount of confidence in the branch prediction information for the fetched branch instructions stored in the branch instruction queue. The method also includes throttling, by a throttle circuit, the fetching of instructions from the instruction source if the confidence information indicates confidence less than a predetermined confidence threshold, wherein the throttling reduces power consumption by the processor.

In another embodiment, a method is disclosed for operating a processor. The method includes fetching, by a fetcher instructions from an instruction source to provide an instruction stream that includes fetched branch instructions. The method also includes storing, by a branch instruction queue, a plurality of fetched branch instructions from the instruction stream. The method further includes speculatively executing, by a branch execution unit, fetched branch instructions by using branch prediction information and resolving whether or not a branch in each fetched branch instruction is taken, thus providing executed branch instructions. The method still further includes storing, by a confidence storage memory, a plurality of confidence values describing the inaccuracy of the branch prediction information of respective fetched branch instructions in the branch instruction queue. The method also includes throttling, by a throttle circuit, the fetching of instructions from the instruction source by the fetcher if a sum of the confidence values exceeds a predetermined threshold, wherein the throttling reduces power consumption by the processor.

In yet another embodiment, a processor is disclosed that includes an instruction source that stores instructions. The processor also includes a fetcher coupled to the instruction source, that fetches instructions from the instruction source to provide an instruction stream that includes fetched branch instructions. The processor further includes a branch execution unit, coupled to the fetcher that speculatively executes fetched branch instructions by using branch prediction information and that resolves whether or not a branch in each branch instruction is taken, thus providing executed branch instructions. The processor also includes a throttle controller that is coupled to the fetcher. The throttle controller is capable of throttling the fetching of instructions by the fetcher. The throttle controller includes a branch instruction queue that stores a plurality of fetched branch instructions. The throttle controller also includes a confidence storage memory that stores respective confidence values for fetched branch instructions in the branch instruction queue. The confidence values describe a lack of confidence in the branch prediction information for respective fetched branch instructions in the branch instruction queue. The throttle controller throttles the fetching of instructions from the instruction source if a sum of the confidence values in the confidence storage memory exceeds a predetermined threshold, such that the throttling reduces power consumption by the processor.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Many contemporary processors employ speculative execution techniques that use branch prediction to increase processing efficiency. An instruction fetcher in the processor fetches a stream of instructions that contains branch instructions. The processor may speculatively execute instructions after a branch instruction in response to a branch prediction. In more detail, after an instruction decoder decodes a fetched branch instruction of the instruction stream, a branch prediction circuit makes a prediction whether or not to take the branch that the branch instruction offers. The branch is either "taken" or "not taken". The branch prediction circuit predicts whether or not to take the branch by using branch history information, namely the branch results when the processor encountered this particular branch instruction in the past. If the branch prediction circuit predicts the branch correctly, then the processor keeps the results of instructions after the branch. However, if the branch prediction is incorrect, then the processor discards the results of instructions after the branch.

The speculative execution of instructions by a processor consumes power. It is desirable to minimize the power that speculative execution activities consume in a manner that does not substantially impact processor performance. In one embodiment, the disclosed processor reduces power consumption by throttling processing activity when the processor encounters a branch instruction for which the processer has low confidence in the prediction of the outcome of that branch instruction. The processor includes a branch instruction queue (BIQ) that stores branch instructions of the instruction stream along with confidence information for each stored branch instruction. The confidence information indicates the level of confidence that the processor exhibits in the correctness of each branch prediction in the BIQ. In one embodiment, the processor sums the number of low confidence branches in the BIQ. If the sum of the number of low confidence branches is greater than a predetermined programmable threshold, then the processor performs instruction fetch throttling to reduce power consumption. This methodology causes little negative impact on processor performance because the processor performs instruction fetch throttling for low confidence branch paths, but does not perform throttling for high confidence branch paths. In other words, the processor continues executing instructions in high confidence branch paths at full speed without throttling.

Figure 1:
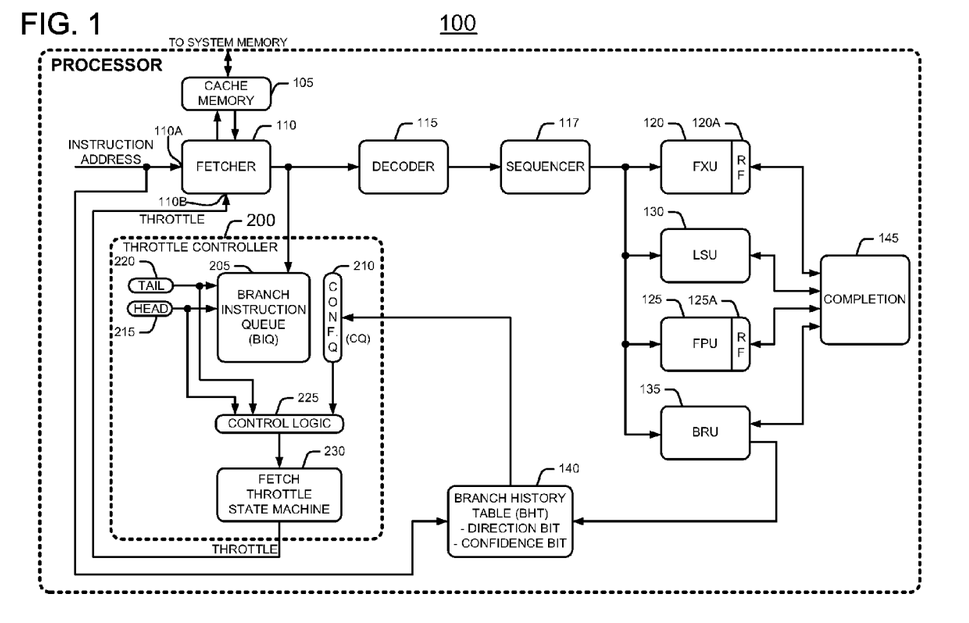
FIG. 1 shows a block diagram of one embodiment of the disclosed processor.

FIG. 1 shows one embodiment of a processor 100 that employs throttling on low confidence branches to reduce the power that the processor consumes. Processor 100 includes a memory 105 such as a local cache memory that includes an instruction stream that processor 100 executes. Memory 105 thus acts as an instruction source. In actual practice, memory 105 attaches to a larger external system memory (not shown) that includes an instruction stream or program that the processor executes. A fetcher 110 couples to memory 105 to fetch instructions from memory 105 for execution. Fetcher 110 includes an instruction address input 110A. A decoder circuit 115 couples to fetcher 110 to decode the fetched instructions it receives from fetcher 110. The fetched instruction stream includes instructions with opcodes and operands. Some instructions of the instruction stream are branch instructions. A sequencer circuit 117 couples to decoder 115. Sequencer circuit 117 determines the appropriate execution unit that should receive a particular decoded instruction for execution. Sequencer circuit 117 couples to the following execution units: fixed point execution unit (FXU) 120, floating point execution (FPU) unit 125, load store unit (LSU) 130 and branch execution unit (BRU) 135. Fixed point execution unit (FXU) 120 includes a register file 120A. Floating point execution unit 125 includes a register file 125A.

The execution units speculatively execute instructions in the instruction stream after a decoded branch instruction. A branch history table (BHT) 140 couples between the instructions address input 110A of fetcher 110 and branch execution unit (BRU) 135. Branch history table 140 tracks the historical outcome of previously executed branch instructions. Branch unit (BRU) 135 uses this historical branch execution information to make branch predictions for branch instructions that it currently receives. A completion unit 145 couples to each of the execution units, namely FXU 120, FPU 125, LSU 130 and BRU 135. More specifically, completion unit 145 couples to FXU register file 120A and FPU register file 125A. Completion unit 145 determines whether or not speculatively executed instructions should complete. If the branch unit (BRU) 135 correctly predicts a branch, then the instructions following the branch should complete. For example, if branch unit 135 correctly predicts a branch, then a fixed point or integer instruction following that branch should complete. In this event, completion unit 145 controls the write back of fixed point results of the branch to fixed point register file 120A. If the instruction following the correctly predicted branch is a floating point instruction, then completion unit 145 controls the write back of the result of that floating point instruction to floating point register file 125A. When instructions complete, they are no longer speculative. The branch execution unit (BRU) 135 operates in cooperation with completion unit 145 and BHT 140 to resolve whether or not a particular branch instruction is taken or not taken.

In more detail, branch history table (BHT) 140 includes a history of previously executed branch instructions. Each entry in the BHT 140 includes a direction bit and a confidence bit. For a particular branch instruction, its entry in the BHT includes a direction bit that indicates "branch taken" or "branch not taken". In one embodiment, the direction bit may equal 0 if the branch was not taken the last time or the direction bit may equal 1 if the branch was taken the last time. In one embodiment, for a particular branch instruction, the direction bit indicates whether the processor should take the branch the next time the processor encounters that branch instruction. The direction bit does not necessary represent the direction of the branch the previous time the processor encountered the branch instruction. However, a majority of the time, the direction bit does indicate the direction of the branch the last time the processor encountered the branch instruction. For the particular branch instruction, the confidence bit may equal 1 if there is low confidence in the branch taken or branch not taken prediction. The confidence bit may equal 0 if there is high confidence in the branch taken or not taken prediction. One reason for a particular branch prediction to exhibit low confidence is that the last two times the processor executed the particular branch instruction, the processor took the branch in one case but not the other. Reasons for a particular branch prediction to exhibit high confidence include that the last two times the processor executed the particular branch instruction, the processor took the branch both times or did not take the branch both times.

Processor 100 includes a throttle control circuit or throttle controller 200 with a branch instruction queue (BIQ) 205. In this particular embodiment, branch instruction queue (BIQ) 205 includes 16 entries, namely up to 16 branch instructions in the instruction stream that the fetcher fetched, but the processor did not yet complete. BIQ 205 may include more or fewer entries than 16 entries depending on the particular application. Throttle controller 200 also includes a confidence tracking queue or confidence queue (CQ) 210 that associates with the BIQ 205. CQ 210 acts as a confidence information storage memory that stores confidence information. For each branch instruction entry of BIQ 205, CQ 210 includes a respective confidence bit. In this particular embodiment, CQ includes 16 entries, namely low confidence bits. For a particular branch instruction entry in BIQ 205, if the respective CQ confidence bit entry in CQ 210 exhibits a logic 1, this indicates low confidence in the branch prediction for this particular branch instruction. However, for a particular branch instruction entry in BIQ 205, if the respective CQ confidence bit entry in CQ 210 exhibits a logic 0, this indicates high confidence in the branch prediction for this particular branch instruction. Throttle controller 200 accesses branch history table 140 to assist in the population of confidence bits in CQ 210. For example, in one embodiment, for a particular branch instruction that BIQ 205 stores, to populate CQ 210 with a corresponding respective confidence bit, throttle controller 200 stores a confidence bit of 1 in the CQ entry if BRU 135 and BHT 140 mispredicted that branch instruction that last time that the processor executed that branch instruction. However, if BRU 135 and BHT 140 correctly predicted that branch instruction the last time the processor executed that branch instruction, then throttle controller 200 populates the respective entry for that branch in the CQ with a confidence bit of 0. In one embodiment, BHT 140 holds or stores the confidence bits or confidence values of respective branch instructions and BHT 140 updates itself when a branch instruction executes. When fetcher 110 fetches a particular branch instruction, CQ 210 accesses BHT 140 and reads and stores the confidence bit corresponding to the particular branch instruction.

Branch instruction queue (BIQ) 205 is a circular queue in the embodiment of FIG. 1. BIQ 205 includes a head pointer shown conceptually as head pointer 215 and a tail pointer shown conceptually as tail pointer 220. Head pointer 215 points to the newest branch instruction in BIQ 205 and tail pointer 220 points to the oldest branch instruction in BIQ 205. As BIQ 205 receives branch instructions from fetcher 110, the head and tail pointers move one branch instruction entry at a time such that head pointer 215 always points to the newest branch instruction to enter BIQ 205 and tail pointer always points to the oldest branch instruction in BIQ 205.

Throttle controller 200 also includes control logic 225 that couples to head pointer 215, tail pointer 220 and confidence queue (CQ) 210. Control logic 225 thus receives the current head pointer, the current tail pointer and all of the confidence bits of CQ 210. The head pointer changes each time another branch instruction enters BIQ 205. The tail pointer changes each time a branch instruction completes. Confidence queue (CQ) 210 stores a respective confidence bit for each branch instruction entry of BIQ 205. In other words, each branch instruction entry of BIQ 205 has an associated corresponding confidence bit in CQ 210. Control logic 225 sums or adds all of the confidence bits of CQ 210 to obtain a confidence bit total. In this particular embodiment, since CQ 210 stores low confidence bits, control logic 225 determines a low confidence bit total. Control logic 225 performs a test to determine if the current low confidence bit total is greater than a predetermined threshold low confidence level. If control logic 225 determines that the current low confidence bit total is indeed greater than the predetermined threshold low confidence level, then throttle controller 200 instructs fetcher 110 to commence fetch throttling to reduce processor power consumption. By fetch throttling in this manner during speculative execution of instructions for which correct branch prediction is unlikely, processor 100 reduces power consumption. However, if the current low confidence bit total is not greater than the predetermined threshold confidence level, then branch prediction is likely correct and control logic 225 permits fetching of the instructions and speculate execution at full speed without throttling.

Figure 2:
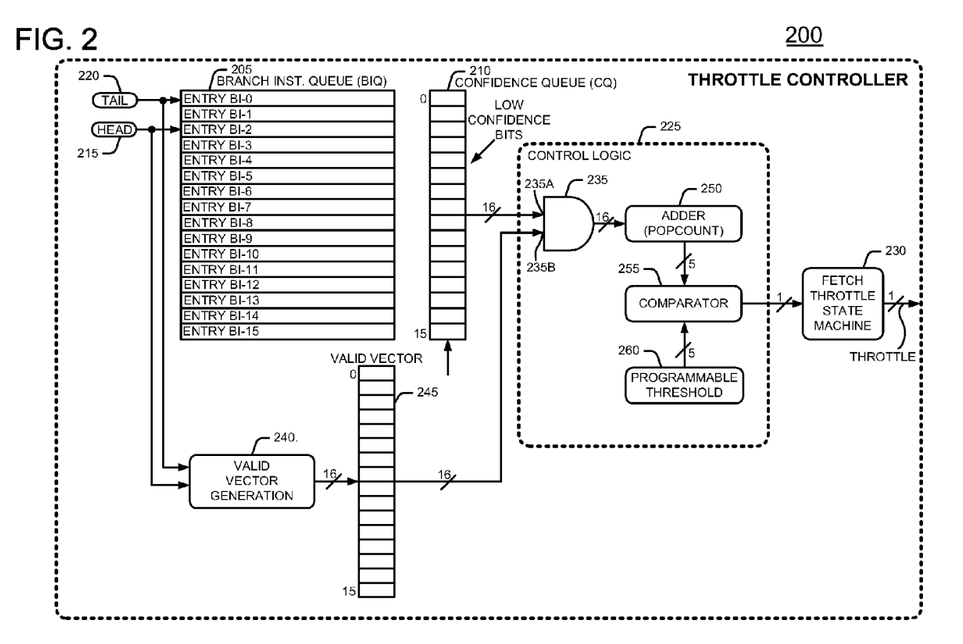
FIG. 2 shows a block diagram of a representative throttle controller that the disclosed processor employs.

FIG. 2 is a more detailed block diagram of throttle controller 200 of FIG. 1. FIG. 2 shows branch instruction queue (BIQ) 205, confidence queue (CQ) 210, control logic 225 and fetch throttle state machine 230 that were already discussed above with reference to FIG. 1. BIQ 205 includes 16 branch instruction entries BI-0, BI-1, . . . BI-15 as shown in FIG. 2. Confidence queue (CQ) includes 16 confidence bit entries designated 0-15. While in FIG. 2, head pointer 215 and tail pointer 220 point to branch instructions BI-0 and BI-2, the head and tail pointers move as new branch instructions come into BIQ 205 from the fetched instruction stream. The particular branch instructions that BIQ 205 stores are in constant flux as the processor fetches, executes and completes branch instructions in the instruction stream. BIQ 205 stores the 16 most recently fetched branch instructions from the fetched instruction stream. Thus, at one point in time, the confidence bits associated with the respective branch instructions in BIQ 205 may indicate that, as a whole, throttle controller has low confidence in the correctness of the predictions for these branch instructions. In that case, throttle controller 200 commences fetch throttling to reduce power consumption. However, at another point in time, the BIQ is populated with another group of branch instructions. In this case, the confidence bits associated with the respective branch instructions of BIQ 205 may indicate that, as a whole, throttle controller 200 has high confidence in the correctness of the predictions for these branch instructions. Thus, throttle controller 200 does not commence fetch throttling to reduce power consumption, but instead instructs fetcher 110 to fetch at full speed.

Control logic 225 includes an AND circuit 235 having a 16 line input 235A and a 16 line input 235B. AND circuit input 235A couples to the 16 slots or storage locations in CQ 210 so that AND circuit 235 receives the 16 confidence bits from CQ 210. The head pointer 215 and tail pointer 220 couple to a valid vector generation circuit 240. Valid vector generation circuit 240 uses the head and tail pointer information to generate a 16 bit vector wherein each bit of the vector corresponds to a different entry of BIQ 205. Each bit of the 16 bit vector indicates whether the corresponding branch instruction entry in BIQ 205 is valid. If a particular bit of the 16 bit vector exhibits a logic 1, then the corresponding branch instruction entry of BIQ 205 is valid, namely the branch instruction is still in process. However, if a particular bit of the 16 bit vector exhibits a logic 0, then the corresponding branch instruction entry of BIQ 205 is not valid. The entries of BIQ 205 that are valid start at the tail pointer and span down to the head pointer. For example, if the head pointer is at entry BI-3 and the tail pointer is at entry BI-7, then the 16 bit valid vector is 0001111100000000. This means that entries BI-3, BI-4, BI-5, BI-6 and BI-7 are valid while the remaining entries are invalid. If the head pointer is above the tail pointer, then the valid vector wraps around and is discontinuous. For example, if the head pointer is at entry BI-14 and the tail pointer is at entry BI-2, then the valid vector is 1110000000000011. This means that entries BI-0, BI-1, BI-2, BI-14 and BI-15 are valid while the remaining entries are invalid. In FIG. 2, valid vector box 245 represents the 16 bits of the valid vector 245.

Thus, at input 235A, AND circuit 235 receives the 16 low confidence bits from CQ 210 while at input 235B, AND circuit 235 receives the 16 bits of the valid vector. When AND circuit 235 logically ANDs the 16 low confidence bits with 16 respective valid vector bits, the valid vector acts as a mask that effectively removes any invalid low confidence bits from the 16 bit result at the output of AND circuit 235. Thus, the 16 bit result at the output of AND gate 235 contains only valid low confidence bits in this particular embodiment. In other words, the 16 low confidence bits at the output of AND circuit 235 correspond to low confidence bits for respective valid branch instructions in BIQ 205.

An adder 250 couples to the output of AND circuit 235. Adder 250 sums the valid low confidence bits it receives from AND circuit 235 to provide a low confidence branch total, namely population count (POPCOUNT), at the output of adder 250. POPCOUNT thus represents the total number of valid low confidence branches in BIQ 205 at particular point in time. A comparator 255 includes one input that couples to adder 250 to receive the low confidence branch total, POP-COUNT, therefrom. A remaining input of comparator 255 couples a programmable threshold circuit 260 that provides a programmable confidence threshold value to comparator 255. The designer or other entity selects the confidence threshold value such that it represents a low confidence level that, if exceeded, indicates that confidence in the predictions for branches in the BIQ is so low that fetch throttling and power conservation should commence.

The output of comparator 255 couples to a fetch throttle state machine 230. If the total number of low confidence branches, POPCOUNT, exceeds the predetermined programmable threshold, then the comparator 255 outputs a logic 1 to fetch throttle state machine 230. In response, fetch throttle state machine 230 sends a THROTTLE signal to fetcher input 110B that instructs fetcher 110 to slow the rate of instruction fetching. Slowing the rated of instruction fetching decreases the amount of power that processor 100 consumes executing branch that are likely not taken, i.e. for low confidence branches. However, if the total number of low confidence branches, POPCOUNT, does not exceed the predetermined programmable threshold, then the comparator 255 outputs a logic 0 to fetch throttle state machine 230. In response, fetch throttle state machine 230 sends a THROTTLE signal to fetcher input 110B that instructs fetcher 110 to fetch instructions at full speed. In that case, the processor exhibits high confidence in the predictions for the branch instructions of the BIQ 205. Thus, speculative execution of branch instructions goes forward at full speed without fetcher throttling and power reduction.

Figure 3:
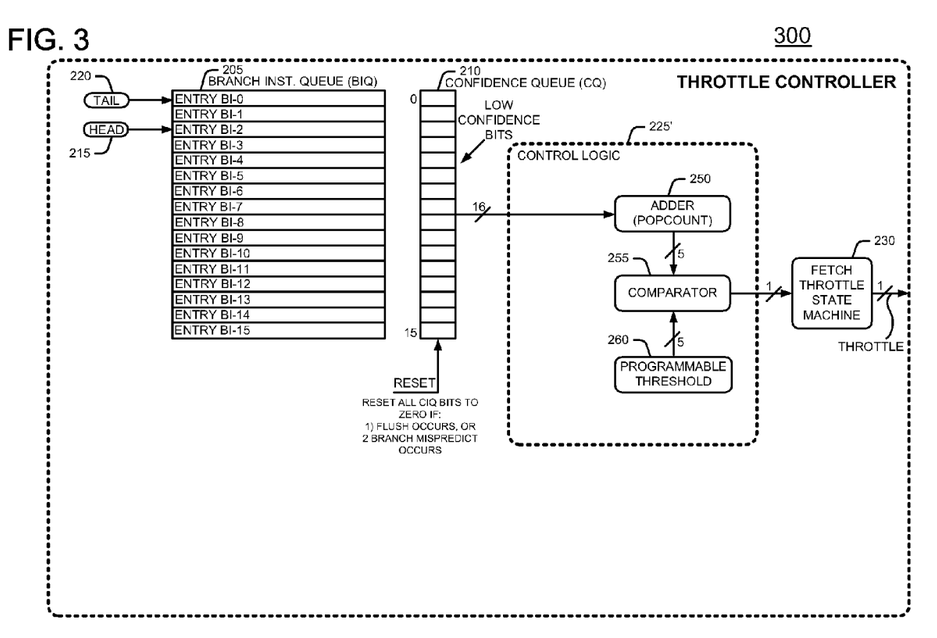
FIG. 3 show a block diagram of an alternative throttle controller that the disclosed processor may employ.

FIG. 3 shows a simplified version of the throttle controller as controller 300. Throttle controller 300 of FIG. 3 is similar to throttle controller 200 of FIG. 2 with like numbers indicating like elements. In throttle controller 300, the controller does not employ valid vector generation to check the validity of the branch instructions in BIQ 205. Thus, throttle controller 300 does not employ a valid vector generator 240 and circuit 235. Control logic 225' of FIG. 3 is similar to control logic 225 of FIG. 2 except control logic 225' does not use AND circuit 235. However, by removing the valid vector generation that checks the validity of the branch instructions in BIQ 205, the low confidence bits that adder 250 receives from CQ 210 may contain bad or stale confidence information. By eliminating the valid vector checking function, it is possible that the throttle controller may throttle the fetcher when it should not. To solve this problem, throttle controller 300 clears all of the confidence bits of CQ 210 whenever processor 100 encounters a flush or branch misprediction. In other words, when the processor encounters a flush or branch misprediction, controller 300 applies a RESET signal to the RESET input of CQ 210 to reset all CQ confidence bits to zero. In actual practice, completion unit 145 sends the RESET signal to the RESET input of CQ 210 (connection not shown). The processor may encounter such a flush operation while exception handling.

Figure 4:
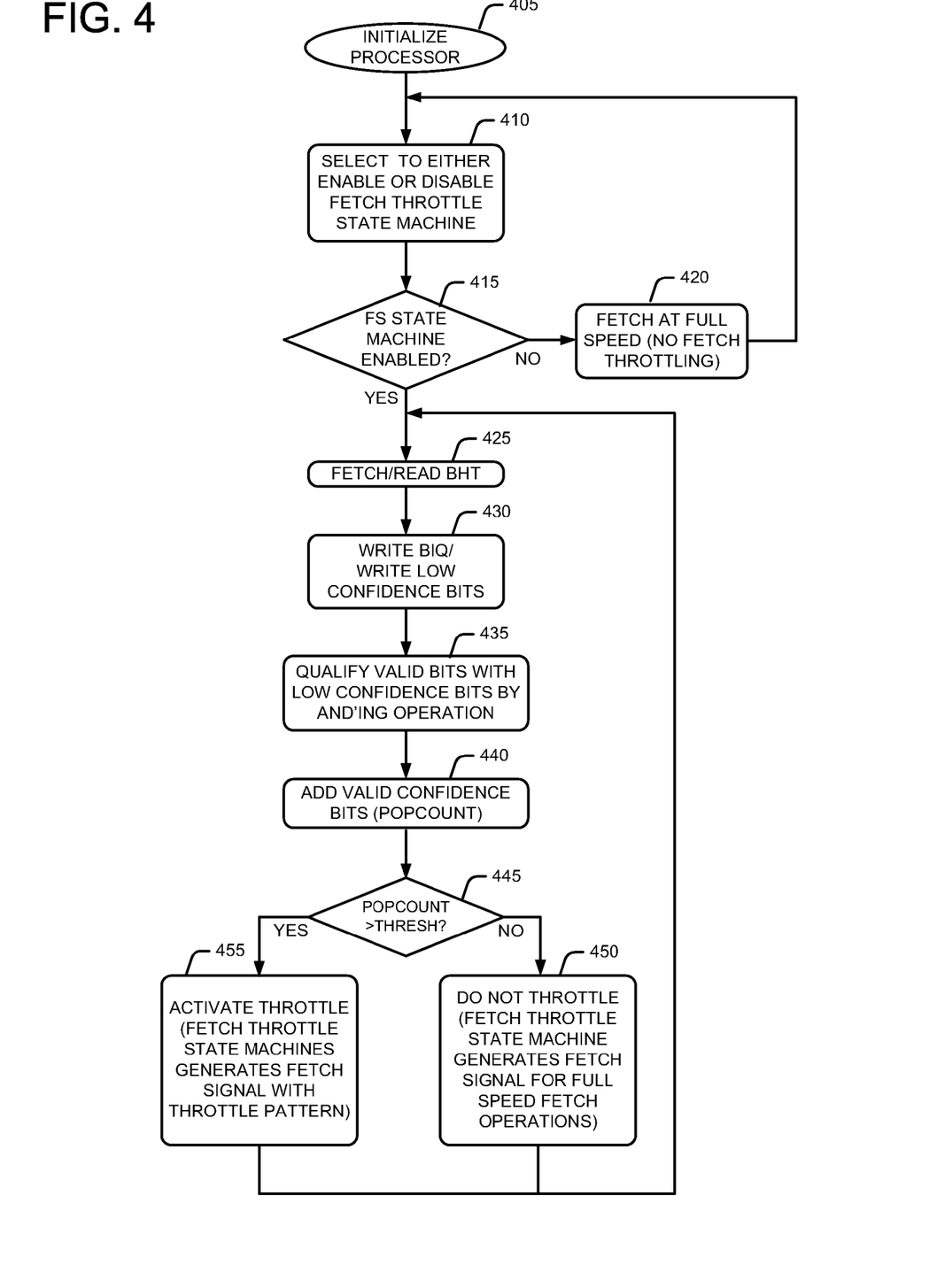
FIG. 4 is a flowchart that shows process flow in the disclosed processor as it conducts fetch throttling operations.

FIG. 4 is a flowchart that depicts process flow in processor 100 as it conducts fetch throttling operations to conserve power when the branch instructions in BIQ 205 exhibit low confidence. For purposes of this flowchart, processor 100 of FIG. 1 employs throttle controller 200 of FIG. 2 as the throttle controller. Process flow commences with the initialization of processor 100, as per block 405. A programmer, designer or other entity makes a selection to enable fetch throttling or disable fetch throttling by the fetch throttling state machine 230, as per block 410. For example, the processor may include a latch (not shown) that the programmer can set upon initialization of the processor to enable or disable fetch throttling. Throttle controller 200 performs a test to determine if the fetch throttle state machine 230 exhibits an enabled state or a disable stated, as per decision block 415. If the fetch throttle state machine 230 is not enabled, then all subsequent fetch operations continue at full normal speed with no fetch throttling by fetch throttle state machine 230, as per block 420. In other words, processor 100 continues executing instructions without benefit of the disclosed power conservation feature. However, if at decision block 415, fetch throttle state machine exhibits the enabled state, then fetcher 110 starts fetching instructions from an instruction stream of instructions that includes branch instructions, as per block 425. At this point, the branch unit (BRU) 135 reads the branch history table (BHT) 140 to obtain a prediction regarding the outcome of branch instructions. At initialization, BHT 140 includes no entries. However, over time, BHT 140 accumulates a history of the outcomes of previous branch instructions in the instruction stream. BHT 140 also includes confidence information that indicates whether it predicted each branch instruction correctly the last time BHT 140 predicted the outcome of the branch. As processor 100 continues to execute instructions of the instruction stream, branch instruction queue (BIQ 205) fills with branch instructions, as per block 430. For each branch instruction of BIQ 205, CQ 210 fills with a respective confidence bit.

Control logic 225 qualifies those confidence bits in CQ 210 that are valid by ANDing a valid vector 245 from valid vector generator 240 with the confidence bits of CQ 210, as per block 435. Adder 250 adds together all of the valid confidence bits from CQ 210 to determine the sum, POPCOUNT, as per block 440. The value of POPCOUNT represents the low confidence branch instruction total. Control logic 225 performs a test to determine if the low confidence branch instruction total, POPCOUNT, is greater than a predetermined low confidence threshold value, THRESH, as per block 445. If decision block 445 determines that the current low confidence branch instruction total, POPCOUNT, is greater then the predetermined low confidence threshold value, THRESH, then the confidence in the accuracy of the branch predictions for the branch instructions in the BIQ is so low that fetch throttle state machine 230 commences fetch throttling. This action reduces power consumption during the speculative execution of low confidence branch instructions and instructions in branches extending from those branch instructions.

In more detail, fetch throttle state machine 230 is a programmable state machine that generates a 1 bit signal, THROTTLE, wherein a 0 indicates "block fetch" and a 1 indicates "allow fetch". The output of state machine 230 couples to fetcher 110 to provide the throttle signal thereto. If the throttle signal equals 0, this instructs the fetcher not to fetch. As explained above, fetch throttle state machine 230 may exhibit an enabled state or a not enabled state depending on a selection by a programmer, designer or other entity. If fetch throttle state machine 230 exhibits the not enabled state, then it always outputs a throttle signal with a value 1 such that fetcher 110 fetches instructions at full speed without throttling, as per block 420. However, if the fetch throttle state machine 230 exhibits the enabled state, then process flow continues through blocks 425, 430, 435, 440 as discussed above.

After determining the low confidence branch instruction total, POPCOUNT, comparator 255 performs a comparison test to determine if the current low confidence branch instruction total, POPCOUNT, is greater than the low confidence threshold level, THRESH. If the current low confidence branch instruction total, POPCOUNT, is not greater than the low confidence threshold, THRESH, then comparator 255 instructs fetch throttle state machine 230 to not throttle, as per block 450. In response, fetch throttle state machine 230 sends a throttle signal, THROTTLE, to fetcher 110, wherein the throttle signal is a series of 1's that instructs fetcher 110 not to throttle. In other words the series of 1's, namely a continuous logic 1 value, of the throttle signal instructs fetcher 110 to fetch instructions at full speed.

However, if the current low confidence branch instruction total, POPCOUNT, is greater than the low confidence threshold, THRESH, then comparator 255 instructs fetch throttle state machine 230 to commence throttling fetcher 111, as per block 455. For example, to cause fetch throttling, state machine 230 generates a throttle signal, THROTTLE, that exhibits a digital pattern that determines the amount of throttling that fetcher 110 employs. In one embodiment, the throttle signal exhibits the digital pattern 1000 which repeats for the duration of throttling operations. The 1 in the pattern instructs the fetcher to fetch during the corresponding machine cycle. The 000 in the pattern instructs the fetcher not to fetch in the next 3 machine cycles. Thus, the digital throttle pattern 1000 instructs fetcher 110 to fetch an instruction once per every four machine cycles. This corresponds to 75% throttling. The digital pattern 1010 provides less throttling than the 1000 digital pattern, namely throttling for 50% of the machine cycles of the processor. Other digital patterns are usable by state machine 230 as the throttle signal depending on the amount of throttling desired for a particular application. In one embodiment, the digital throttling pattern is programmable according to the amount of throttling and power conservation desired.

Figure 5:
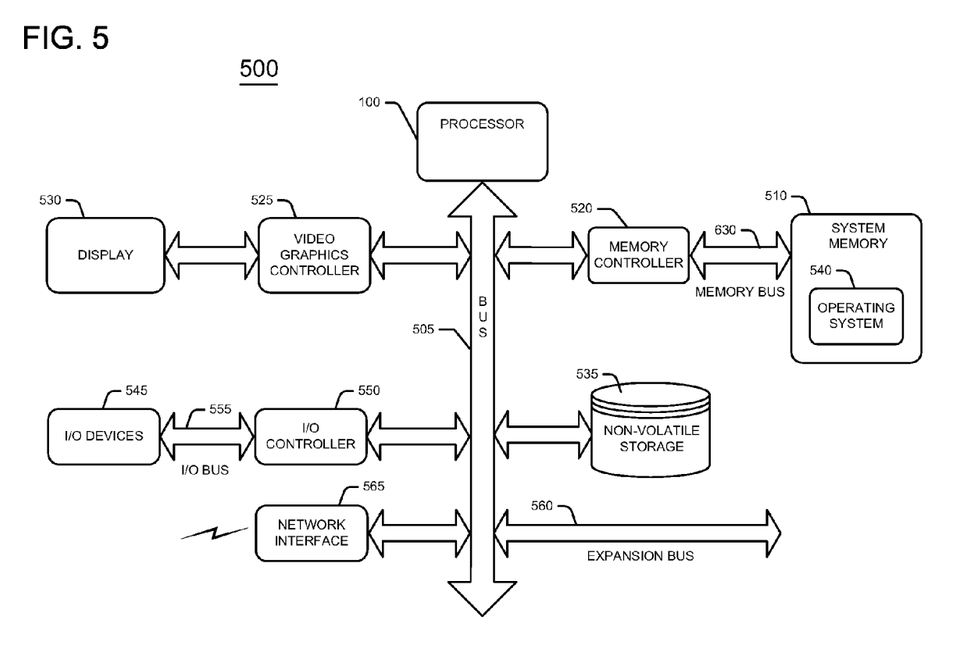
FIG. 5 is block diagram of an information handling system (HIS) that employs the disclosed processor of FIG. 1.

FIG. 5 shows an information handling system (IHS) 500 that employs processor 100. An IHS is a system that processes, transfers, communicates, modifies, stores or otherwise handles information in digital form, analog form or other form. IHS 500 includes a bus 505 that couples processor 100 to system memory 510 via a memory controller 520. A video graphics controller 525 couples display 530 to bus 505. Nonvolatile storage 535, such as a hard disk drive, CD drive, DVD drive, or other nonvolatile storage couples to bus 505 to provide IHS 500 with permanent storage of information. An operating system 540 loads in memory 510 to govern the operation of IHS 500. I/O devices 545, such as a keyboard and a mouse pointing device, couple to bus 505 via I/O controller 550 and I/O bus 555. One or more expansion busses 560, such as USB, IEEE 1394 bus, ATA, SATA, PCI, PCIE and other busses, couple to bus 505 to facilitate the connection of peripherals and devices to IHS 500. A network adapter 565 couples to bus 505 to enable IHS 500 to connect by wire or wirelessly to a network and other information handling systems. While FIG. 5 shows one IHS that employs processor 100, the IHS may take many forms. For example, IHS 500 may take the form of a desktop, server, portable, laptop, notebook, or other form factor computer or data processing system. IHS 500 may take other form factors such as a gaming device, a personal digital assistant (PDA), a portable telephone device, a communication device or other devices that include a processor and memory.

While in the embodiments described above, CQ 210 stores confidence bits that describe the confidence in the branch predictions for the branch instructions in BIQ 205 in terms of low confidence for those predictions, an equivalent method and apparatus may invert the logic of the processor and still practice the disclosed technology. For example, processor 100 may employ confidence information in the CQ 210 that describes the amount of high confidence in the branch predictions for the branch instructions in the BIQ 205, as opposed to the amount of low confidence in branch predictions of the embodiment of FIG. 1. In such an embodiment, the confidence bits in the CQ 210 indicate confidence in the accuracy of the branch predictions for the branch instructions that the BIQ 205 stores. Adder 250 still adds the confidence bits together as described above to determine the POPCOUNT value. However, comparator 255 performs a test to determine if the POPCOUNT value, that indicates the level of confidence in the accuracy of the branch predictions for the BIQ branch instructions, is greater that a predetermined threshold level of confidence. If the confidence expressed by POPCOUNT exceeds the predetermined threshold level of confidence, then the THROTTLE signal from the state machine 230 instructs fetcher 110 not to throttle. Because confidence in the accuracy of the branch predictions for the BIQ branch instructions is so high, speculative execution of fetched instructions continues forward at full speed without fetch throttling and without power conservation. However, if POPCOUNT does not exceed the predetermined threshold level of confidence, then the THROTTLE signal from the state machine 230 instructs fetcher 110 to throttle. In other words, because confidence in the accuracy of the branch predictions for the BIQ branch instructions is so low, fetcher 110 commences fetch throttling so that speculative execution of fetched instructions continues forward at reduced speed to conserve power. In an alternative embodiment, it is possible that confidence queue (CQ) 210 exists inside of branch instruction queue (BIQ) 205 as long as for each BIQ branch instruction entry, BIQ 205 stores a respective confidence bit.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of operating a processor, the method comprising:

fetching, by a fetcher instructions from an instruction source to provide an instruction stream that includes one or more fetched branch instructions;

storing, by a branch instruction queue having a plurality of entries, the one or more branch instructions from the instruction stream, wherein each of the one or more branch instructions occupies one of the entries, and wherein the recently stored one or more branch instructions is designated as valid, meaning that the branch instruction is in process;

in response to a branch instruction being stored in the branch instruction queue, dynamically pointing, by the branch instruction queue, a head pointer to a newest, valid, branch instruction stored in one of the entries, and dynamically pointing a tail pointer to an oldest, valid, branch instruction stored in one of the entries, such that any branch instructions positioned between the head pointer and the tail pointer are valid;

speculatively executing, by a branch execution unit, one or more fetched branch instructions by using branch prediction information and resolving whether or not a branch in the speculatively executed branch instruction is taken, thus providing one or more executed branch instructions;

designating as invalid the one or more executed branch instructions in the branch instruction queue and moving the tail pointer such that the tail pointer points to the oldest, valid, branch instruction stored in the branch instruction queue;

storing, by a confidence storage memory, a confidence value describing an amount of confidence in the branch prediction information for each fetched branch instruction stored in the branch instruction queue;

summing the confidence values of the branch instructions positioned from the head pointer to the tail pointer stored in the branch instruction queue, thus generating a confidence value total for valid branch instructions only;

throttling, by a throttle circuit, the fetching of instructions from the instruction source if the confidence value total indicates confidence less than a predetermined confidence threshold, wherein the throttling reduces power consumption by the processor; and repeating the above steps.

2. The method of claim 1, wherein the throttling step further comprises instructing, by the throttle circuit, the fetcher to fetch instructions from the instruction source without throttling if the confidence value total does not indicate confidence less than the predetermined confidence threshold.

3. The method of claim 1, further comprising generating, by a valid vector generation circuit, a valid vector that identifies valid and invalid fetched branch instructions stored in the branch instruction queue.

4. The method of claim 3, further comprising logically ANDing, by an AND circuit, the valid vector with the confidence values of each branch instruction currently in the branch instruction queue to obtain a valid confidence value for each valid branch instruction.

5. The method of claim 1, wherein the throttling step comprises:
comparing, by a comparator, the confidence value total with the predetermined threshold; and
reducing, by a fetch throttle state machine, a rate of fetching instructions from the instruction source by the fetcher if the comparator determines that the confidence value total exceeds the predetermined threshold, the fetch throttle state machine otherwise allowing fetching of instructions by the fetcher from the instruction source at full speed.

6. The method of claim 1, wherein the predetermined threshold is a programmable threshold.

7. A processor comprising:
an instruction source that stores instructions;
a fetcher coupled to the instruction source, that fetches instructions from the instruction source to provide an instruction stream that includes one or more fetched branch instructions;
a branch execution unit, coupled to the fetcher that speculatively executes one or more of the fetched branch instructions by using branch prediction information and that resolves whether or not a branch in the speculatively executed branch instruction is taken, thus providing one or more executed branch instructions; and
a throttle controller, coupled to the fetcher capable of throttling the fetching of instructions by the fetcher the throttle controller including:
a branch instruction queue, having a plurality of entries, that stores the one or more fetched branch instructions from the instruction stream, wherein each of the one or more branch instructions occupies one of the entries, and wherein the recently stored one or more branch instructions is designated as valid, meaning that the branch instruction is still in process;
the branch instruction queue having a head pointer for dynamically pointing to a newest, valid, branch instruction in response to a branch instruction being stored in the branch instruction queue, and a tail pointer dynamically pointing to an oldest, valid, branch instruction stored in the branch instruction queue, such that any branch instructions positioned between the head pointer and the tail pointer are valid;
a valid vector for designating as invalid the one or more executed branch instructions in the branch instruction queue;
the branch instruction queue for moving the tail pointer such that the tail pointer points to the oldest, valid, branch instruction stored in the branch instruction queue;
a confidence storage memory that stores a confidence value describing an amount of confidence in the branch prediction information for each fetched branch instruction stored in the branch instruction queue;
an adder for summing the confidence values of the branch instruction positioned from the head pointer to the tail pointer stored in the branch instruction queue, thus generating a confidence value total for valid branch instructions only; and
the throttle controller throttling the fetching of instructions from the instruction source if the confidence value total indicates confidence less than a predetermined confidence threshold, wherein the throttling reduces power consumption by the processor.

8. The processor of claim 7, wherein the throttle controller instructs the fetcher to fetch instructions from the instruction source without throttling if the confidence value total does not indicate confidence less than the predetermined confidence threshold.

9. The processor of claim 7, further comprising a valid vector generation circuit that generates the valid vector that identifies valid and invalid fetched branch instructions stored in the branch instruction queue.

10. The processor of claim 9, further comprising an AND circuit, coupled to the confidence storage memory and the valid vector generation circuit that logically ANDs the valid vector with the confidence values of each branch instruction currently in the branch instruction queue to obtain a valid confidence value for each valid branch instruction.

11. An information handling system (IHS), the IHS comprising:
a memory;
a processor coupled to the memory, the processor including:
an instruction source that stores instructions, the instruction source being coupled to the memory;
a fetcher coupled to the instruction source, that fetches instructions from the instruction source to provide an instruction stream that includes one or more fetched branch instructions;
a branch execution unit, coupled to the fetcher that speculatively executes one or more of the fetched branch instructions by using branch prediction information and that resolves whether or not a branch in the speculatively executed branch instruction is taken, thus providing one or more executed branch instructions; and a throttle controller, coupled to the fetcher capable of throttling the fetching of instructions by the fetcher the throttle controller including:

a branch instruction queue, having a plurality of entries, that stores the one or more fetched branch instructions from the instruction stream, wherein each of the one or more branch instructions occupies one of the entries, and wherein the recently stored one or more branch instructions is designated as valid, meaning that the branch instruction is still in process;

the branch instruction queue having a head pointer for dynamically pointing to a newest, valid, branch instruction in response to a branch instruction being stored in one of the entries, and a tail pointer for dynamically pointing to an oldest, valid, branch instruction stored in one of the entries, such that any branch instructions positioned between the head pointer and the tail pointer are valid;

a valid vector for designating as invalid the one or more executed branch instructions in the entries of the branch instruction queue;

the branch instruction queue for moving the tail pointer such that the tail pointer points to the oldest, valid, branch instruction stored in the entries of the branch instruction queue;

a confidence storage memory that stores a respective confidence value for each of the fetched branch instruction in the branch instruction queue, the confidence values describing a lack of confidence in the branch prediction information for respective fetched branch instructions in the branch instruction queue;

an adder for summing the confidence value of the branch instructions positioned from the head pointer to the tail pointer stored in the branch instruction queue, thus generation a confidence value total for valid branch instructions only; and the throttle controller throttling the fetching of instructions from the instruction source if the confidence value total in the confidence storage memory exceeds a predetermined threshold, wherein the throttling reduces power consumption by the processor.

12. The IHS of claim 11, wherein the processor includes a valid vector generation circuit that generates a valid vector that identifies valid and invalid fetched branch instructions stored in the branch instruction queue.

13. The IHS of claim 12, wherein the processor includes an AND circuit, coupled to the confidence storage memory and the valid vector generation circuit that logically ANDs the valid vector with the confidence values of each branch instruction currently in the branch instruction queue to obtain a valid confidence value for each valid branch instruction.

14. The IHS of claim 13, wherein the adder is an adder circuit, coupled to the AND circuit, that adds the valid confidence values to obtain the confidence value total stored in the confidence storage memory.

15. The IHS of claim 14 wherein the processor includes a comparator, coupled to the adder circuit and a threshold circuit, that compares the confidence value total with the predetermined threshold that the threshold circuit provides.

16. The IHS of claim 15, wherein the processor includes a fetch throttle state machine, coupled to the comparator and the fetcher the fetch throttle state machine reducing a rate of fetching instructions by the fetcher from the instruction source if the comparator determines that the confidence value total exceeds the predetermined threshold, the fetch throttle state machine otherwise allowing fetching of instructions by the fetcher from the instruction source at full speed.

17. The IHS of claim 16, wherein the processor includes a programmable threshold circuit that provides the predetermined threshold.

* * * * *